United States Patent
McCalib, Jr. et al.

(10) Patent No.: US 9,988,216 B1
(45) Date of Patent: Jun. 5, 2018

(54) PARALLEL VERTICAL RECIRCULATING GANTRY SYSTEM

(71) Applicant: Amazon Technologies, Inc., Seattle, WA (US)

(72) Inventors: David Bruce McCalib, Jr., Seattle, WA (US); Bryan Gregory Drake, Seattle, WA (US); Tak Keung Joseph Lui, Bellevue, WA (US); Brent Lutz, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/382,583

(22) Filed: Dec. 16, 2016

(51) Int. Cl.
| | |
|---|---|
| *B65G 1/04* | (2006.01) |
| *B65G 37/00* | (2006.01) |
| *B65G 57/04* | (2006.01) |
| *B65G 57/10* | (2006.01) |
| *B65G 43/00* | (2006.01) |
| *B65G 15/00* | (2006.01) |
| *B65G 17/32* | (2006.01) |
| *B65G 47/91* | (2006.01) |

(52) U.S. Cl.
CPC ........... *B65G 43/00* (2013.01); *B65G 1/0492* (2013.01); *B65G 15/00* (2013.01); *B65G 17/323* (2013.01); *B65G 37/00* (2013.01); *B65G 47/912* (2013.01); *B65G 2203/0216* (2013.01)

(58) Field of Classification Search
CPC .. B65G 1/0492; B65G 1/026; B65G 1/17323; B65G 47/912

USPC ... 198/346.3, 349.6, 358, 468.4, 471.1, 617, 198/678.1, 689.1, 890; 414/626, 627; 700/214, 215, 218, 228, 230
See application file for complete search history.

(56) References Cited

U.S. PATENT DOCUMENTS

| | | | | |
|---|---|---|---|---|
| 4,973,219 A | * | 11/1990 | Brickner | B65G 63/004 104/88.05 |
| 5,024,315 A | * | 6/1991 | Ward | B23Q 7/03 198/341.08 |
| 5,415,518 A | * | 5/1995 | Montgomery | B65G 61/00 414/791.6 |
| 5,469,953 A | * | 11/1995 | Igarashi | H05K 13/0408 198/345.2 |
| 5,908,283 A | | 6/1999 | Huang et al. | |
| 6,011,998 A | * | 1/2000 | Lichti | B65G 1/1376 414/268 |

(Continued)

OTHER PUBLICATIONS

U.S. Appl. No. 15/382,588, entitled "Parallel Recirculating Gantry System on a Rollercoaster-Style Track," and filed Dec. 16, 2016.

(Continued)

*Primary Examiner* — Douglas A Hess
(74) *Attorney, Agent, or Firm* — Thomas | Horstemeyer, LLP

(57) ABSTRACT

Disclosed are various embodiments for a vertically recirculating gantry system operating in parallel with multiple actuators on multiple gantries. A plurality of items are retrieved from a plurality of picking locations via a plurality of actuators disposed on a gantry spanning a width of the plurality of conveyors. The gantry is moved along a track toward a plurality of stowage locations. Individual items are deposited in respective stowage locations via the plurality of actuators as the gantry moves over the stowage locations.

20 Claims, 14 Drawing Sheets

(56) References Cited

U.S. PATENT DOCUMENTS

| | | | |
|---|---|---|---|
| 6,238,173 B1* | 5/2001 | Corsini | B65G 47/086 |
| | | | 414/788.1 |
| 6,579,053 B1* | 6/2003 | Grams | B25J 15/10 |
| | | | 198/348 |
| 6,718,229 B1 | 4/2004 | Takebayashi et al. | |
| 7,165,669 B2* | 1/2007 | Menschig | B23Q 7/1426 |
| | | | 198/468.2 |
| 7,216,806 B2* | 5/2007 | Kurita | G06Q 10/08 |
| | | | 235/375 |
| 7,578,650 B2* | 8/2009 | Aalund | H01L 21/67775 |
| | | | 414/217 |
| 8,092,140 B2* | 1/2012 | Baker | B65G 1/1373 |
| | | | 198/347.4 |
| 8,793,012 B2* | 7/2014 | Corcoran | G01V 5/0008 |
| | | | 414/281 |
| 8,875,866 B2* | 11/2014 | Sebe | B65G 47/61 |
| | | | 198/346.3 |
| 9,385,019 B2* | 7/2016 | Fosnight | B65G 1/0464 |
| 9,514,430 B2* | 12/2016 | Miette | B07C 3/02 |
| 9,592,970 B2* | 3/2017 | Henderson | B65G 57/24 |
| 9,734,368 B1* | 8/2017 | Kantor | G01S 1/02 |
| 2003/0113197 A1 | 6/2003 | Hwang et al. | |
| 2003/0235486 A1 | 12/2003 | Doherty et al. | |
| 2007/0209976 A1 | 9/2007 | Worth et al. | |
| 2008/0169601 A1 | 7/2008 | Frank et al. | |
| 2009/0118858 A1 | 5/2009 | Wallace et al. | |
| 2010/0242661 A1 | 9/2010 | Mignano et al. | |
| 2014/0017052 A1 | 1/2014 | Honkanen et al. | |
| 2014/0244026 A1 | 8/2014 | Neiser | |
| 2015/0053530 A1 | 2/2015 | Schneider | |
| 2015/0316604 A1 | 11/2015 | McCord et al. | |
| 2016/0247702 A1 | 8/2016 | Adachi et al. | |
| 2016/0280460 A1 | 9/2016 | Porat | |
| 2017/0320101 A1 | 11/2017 | Bombaugh et al. | |
| 2018/0043397 A1 | 2/2018 | Bombaugh | |

OTHER PUBLICATIONS

U.S. Appl. No. 15/382,588 filed on Dec. 16, 2016, Notice of Allowance dated Apr. 18, 2018.

* cited by examiner

PARALLEL VERTICAL RECIRCULATING GANTRY SYSTEM

BACKGROUND

A significant task in materials handling facilities involves sortation of items. Items are shipped to various destinations, and it is important to group items together that are being shipped to a common destination or via a common transport. For instance, items may be grouped together on a pallet for shipment. Current approaches for sortation are burdened with high amounts of manual sortation labor. Manual sortation is slow, expensive, and likely to result in errors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
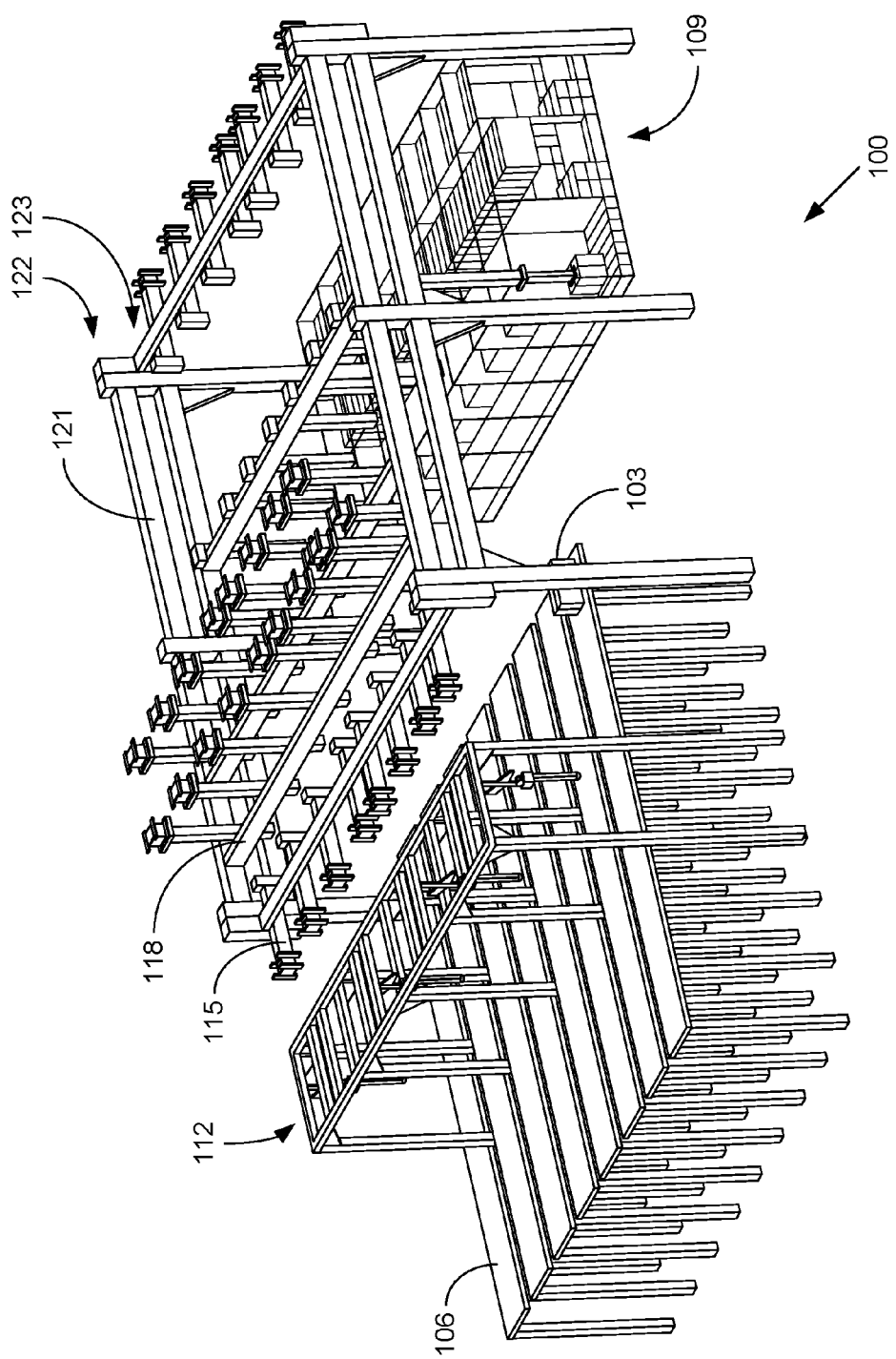
FIG. 1 is a drawing of a perspective view of a vertically recirculating gantry system according to one embodiment of the present disclosure.

The present disclosure relates to recirculating gantry systems for sortation of items in a materials handling facility, such as a warehouse, distribution center, cross-docking facility, or fulfillment center. Current approaches to sortation of items and building up pallets are highly labor intensive. For instance, workers may manually retrieve items, determine a destination pallet, and then manually place the items on the pallet to build up the pallet. The workers may then use forklifts or pallet dollies to move the finished pallets around the materials handling facility. Such approaches have slow throughput, are costly in terms of manual labor, and are likely to result in human-caused errors.

Various embodiments of the present disclosure introduce recirculating gantry systems that can sort items and build pallets in an automated way, thereby increasing throughput while reducing costs and errors. Items such as boxes, containers, bubble-wrapped flats, and so forth are automatically routed to one of multiple parallel picking locations, such as conveyors or pallets. The items are retrieved from the picking locations by one or more actuators on an overhead gantry supported for movement along a track and spanning the picking locations. The gantry moves along the track in a first direction towards a series of side-by-side stowage locations, such as pallets or conveyors, past the end of the picking locations. Where the stowage locations are pallets, the stowage locations may be multiple pallets deep in the first direction, such that several stowage locations are aligned with each picking location. Each actuator deposits its respective cargo on a corresponding stowage location as the gantry moves along the track over the stowage location. Also, an actuator may move left or right along the gantry to deposit its item in a parallel stowage location. In this way, N items in N parallel picking areas can be retrieved and sorted through a single gantry pass into a respective set of M destinations per picking area, for a total of N×M possible destinations.

As will be described, the overhead gantries are capable of automated recirculation. In a first embodiment, the recirculation is vertical, where, after depositing the items in the stowage locations, the gantry moves about a track having upper and lower runs that are spaced vertically from each other to return to the picking locations to retrieve another load of items. In a second embodiment, the recirculation is horizontal, where, after depositing the items in the stowage locations, the gantry moves about a horizontally oriented track to return to the picking locations to retrieve another load of items. In a variation on the second embodiment, the picking locations and stowage locations may be mirrored on the opposite side of the horizontal track such that the gantry arrives at another set of picking locations after dropping off items in stowage locations. Also, in any embodiment, multiple gantries may operate simultaneously on the same track, such that after a first gantry retrieves a first set of items from the picking locations and begins moving towards the stowage locations, a second gantry following behind the first on the track retrieves a second set of items from the picking locations, and so forth. In the following discussion, a general description of the system and its components is provided, followed by a discussion of the operation of the same.

Referring now to FIG. 1, shown is a perspective view of a vertically recirculating gantry system 100 according to one embodiment. The vertically recirculating gantry system 100 is operable to sort and distribute items 103 arriving via multiple picking locations 106 in a picking area to multiple stowage locations 109 in a stowage area. In this example, the picking locations 106 are conveyors, while the stowage locations 109 are pallets. In other examples, stowage locations 109 may be conveyors, etc., while picking locations 106 may be pallets, etc. As the items 103 arrive via the picking locations 106, vertically mounted robots 112 may orient the items 103 on the picking locations 106 so as to be ready to be retrieved by the actuators 115. For example, the vertically mounted robots 112 may pick up items 103 via a mechanical grip or via suction applied through pneumatic pads and then rotate the items 103 and/or move the items 103 left or right. Although multiple independent picking conveyors are shown as the picking locations 106, in other scenarios a single conveyor with multiple lanes may be utilized.

The actuators 115 are disposed on a gantry 118 having a beam that spans the width of the picking locations 106 and the stowage locations 109. The gantry 118 moves about a track 121 with an upper run 122 and a lower run 123, spaced vertically from each other, such that the gantry 118 travels in a path over the stowage locations 109. After retrieving items 103, the actuators 115 move via the gantry 118 over the stowage locations 109 and then deposit the items 103 in respective stowage locations 109. The actuators 115 may be vertically telescoping to reach into the stowage locations 109 to deposit the items 103. After passing over the stowage locations 109, the gantry 118 and the actuators 115 vertically recirculate about the track 121 in order to return to the picking locations 106. The gantry 118 and actuators 115 invert and travel back upside down.

As shown in FIG. 1, there may be multiple gantries 118 moving simultaneously about the vertically oriented track 121. This creates a parallelized situation providing for exceptionally high throughput as items are removed from the picking locations 106 through a single pass of actuators 115 of one gantry 118, while items 103 are also being deposited in the stowage locations 109 by another gantry 118.

Figure 2A:
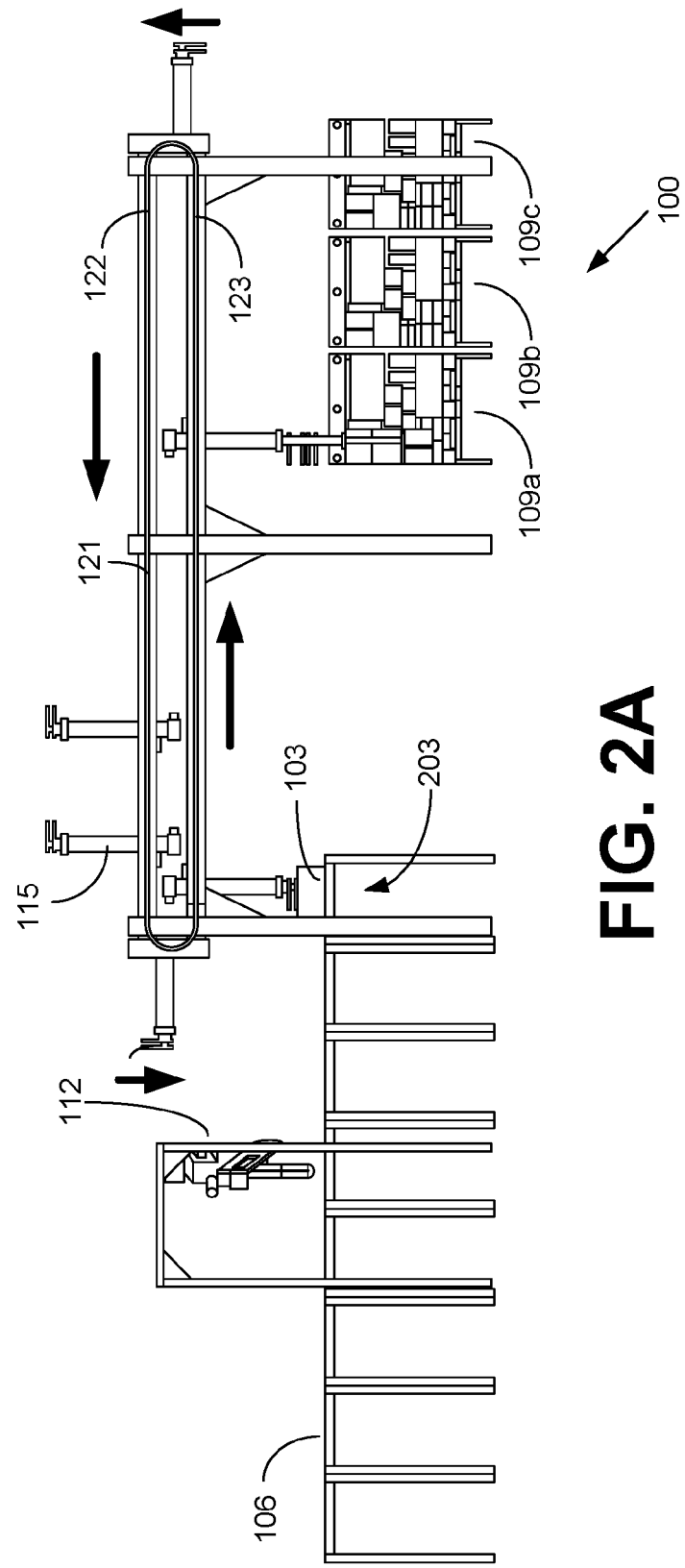
FIG. 2A is a drawing of a side view of the vertically recirculating gantry system of FIG. 1 according to one embodiment of the present disclosure.

Turning now to FIG. 2A, shown is a side view of the vertically recirculating gantry system 100 of FIG. 1 according to one embodiment. As indicated by the arrows indicating direction of travel, the gantries 118 (FIG. 1) and actuators 115 move in a counter-clockwise direction in this example. At position 203, multiple actuators 115 are able to simultaneously retrieve multiple items 103 from the side-by-side picking locations 106. The actuators 115 may use negative pressure or suction, electrostatic force, a mechanical grasp, or another approach to retrieve the items 103. In one embodiment, the gantry 118 includes a single vacuum source that is operable to create suction at each of the actuators 115. After retrieving an item 103, an actuator 115 may activate a wire gripper underneath the item 103 that can open and close to maintain a grip on the item 103 in the event of loss of power or a malfunction that otherwise releases the item 103. For example, when the item 103 is picked up, the wire gripper may be open. Subsequently, a wire or other mechanical support can close in to secure the item 103 mechanically.

As the actuators 115 retrieve the items 103, identifiers on the items 103 may be scanned, and specific destination stowage locations 109 may be determined for the items 103. As shown in FIG. 2A, three stowage locations 109a, 109b, and 109c are arranged in a line with the picking location 106. The actuator 115 may deposit an item 103 in any one of the stowage locations 109a, 109b, or 109c, thereby sorting the item 103 to an appropriate destination. As shown, the actuator 115 may vertically telescope downward to place the item 103 appropriately within a selected item storage location 109a.

Figure 2B:
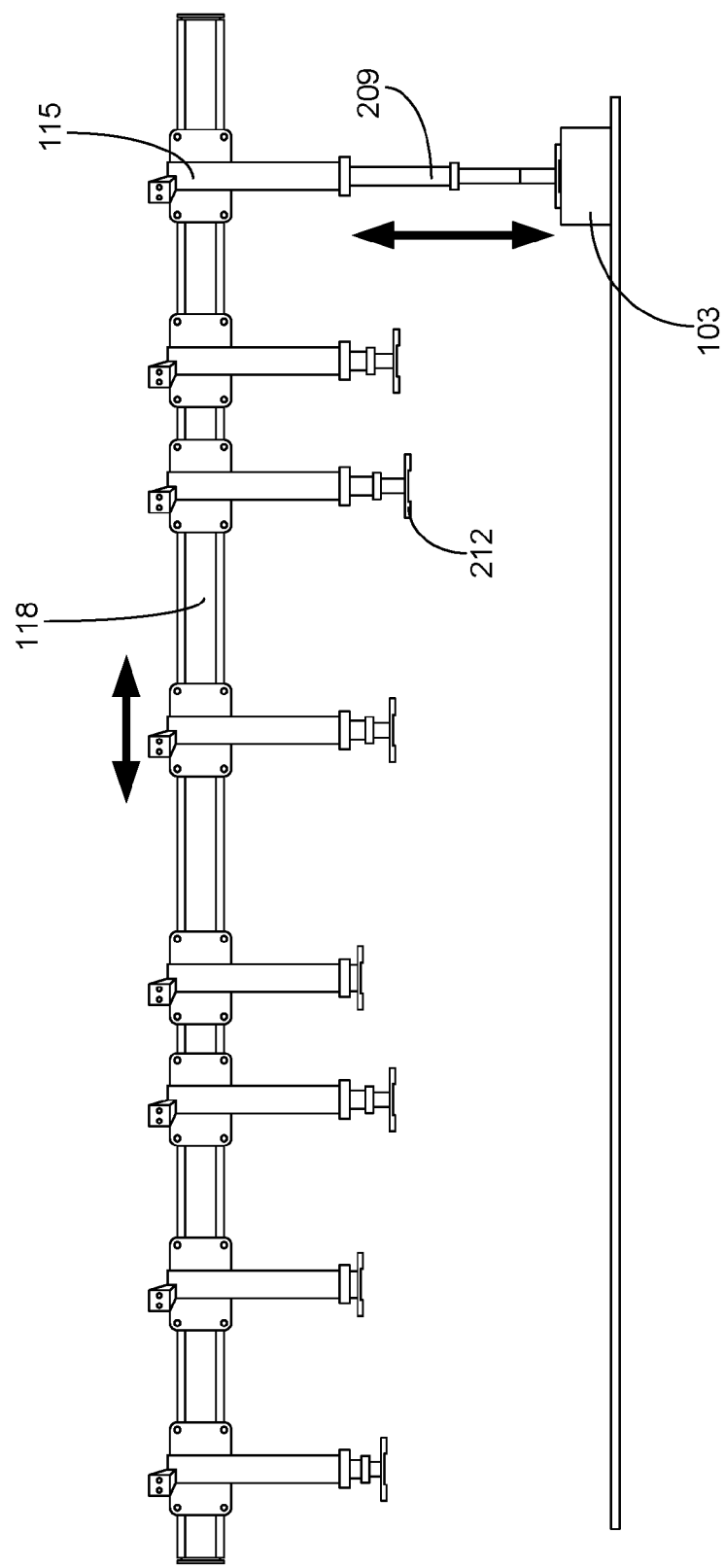
FIG. 2B is a drawing of a lengthwise view of a gantry employed in the vertically recirculating gantry system of FIG. 1 according to one embodiment of the present disclosure.

Continuing to FIG. 2B, shown is a drawing of a lengthwise view of a gantry 118 employed in the vertically recirculating gantry system 100 (FIG. 1) according to one embodiment. As shown in this example, the gantry 118 has eight actuators 115, but more or fewer actuators 115 may be used in other examples. The actuators 115 are capable of lateral movement along the gantry 118, either through motors in the individual actuators 115 or attachment of the actuators 115 to a drive cable, belt, etc. that facilitates movement along the gantry 118.

Also, the actuators 115 are capable of moving up and down, via a vertically telescoping arm 209. In this example, one or more pneumatic pads 212 are attached at the bottom of the actuator 115 in order to apply vacuum force to grab and retain an item 103 from a picking location 106 (FIG. 2) and deposit the item 103 into a stowage location 109 (FIG. 2). A wire gripper may be used underneath the item 103 to retain the item 103 in the event of loss of vacuum suction.

In various embodiments, the gantry 118 itself may be capable of telescoping horizontally in order to extend the reach of the actuators 115 by allowing for additional lateral movement. This would increase or decrease the footprint of what items 103 can be reached via the system, thereby potentially increasing or decreasing the system's throughput.

In various embodiments, the actuators 115 may be capable of one or more degrees of freedom. As discussed, actuators 115 may move side-to-side on a gantry 118 or up-and-down via the vertically telescoping arm 209. An actuator 115 may also move in various embodiments via a rotation axis or in combinations to create screw motions (i.e., rotation coupled with translation). Also, in some embodiments, multiple actuators 115 may function collaboratively. For example, two actuators 115 may assist in retrieving and/or depositing a single item 103. Where actuators 115 on gantries 118 are retrieving items 103 from conveyors, the use of multiple recirculating gantries 118 may allow the actuators 115 to pick the items 103 from the conveyors while matching the speed of the conveyors.

Figure 3:
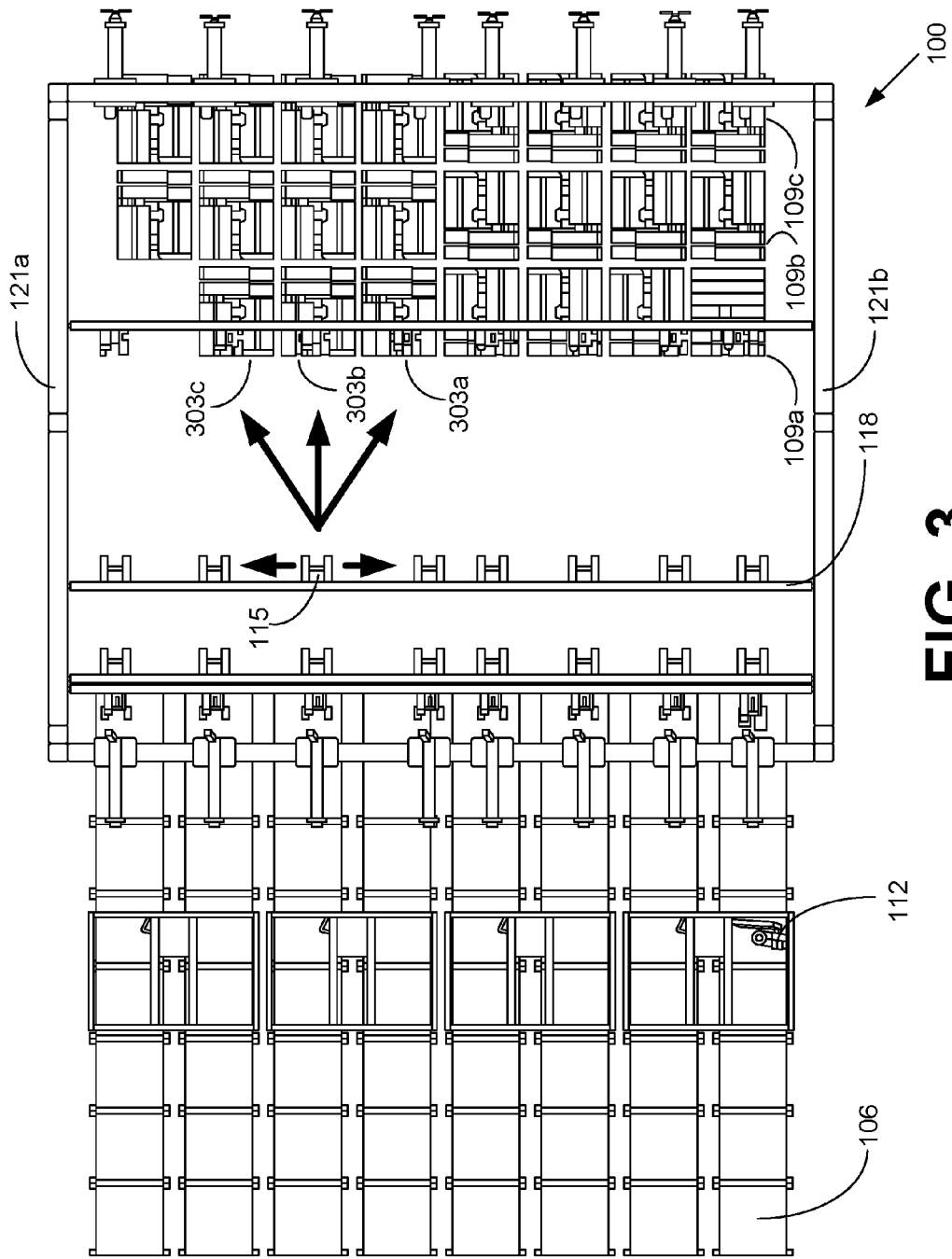
FIG. 3 is a drawing of an overhead view of the vertically recirculating gantry system of FIG. 1 according to one embodiment of the present disclosure.

Moving on to FIG. 3, shown is an overhead view of the vertically recirculating gantry system 100 of FIG. 1 according to one embodiment. As indicated by the directional arrows on FIG. 3, an actuator 115 may be capable of lateral movement along the gantry 118. This lateral movement may be limited due to the presence of multiple actuators 115 on the same gantry 118. As shown in this example, a given actuator 115 may be moved left by one position or may be moved right by one position in order to deposit an item 103 in any one of the rows 303a, 303b, or 303c of stowage locations 109a, 109b, or 109c that may be in line with the parallel picking locations 106.

Also, FIG. 3 illustrates that the gantries 118 may be supported on the ends by the tracks 121a and 121b. This is merely by way of example, as other number of tracks 121 may be used at differing positions for supporting the gantries 118. In one example, the tracks 121 may include gearing that drives the gantries 118 along the tracks 121.

Figure 4:
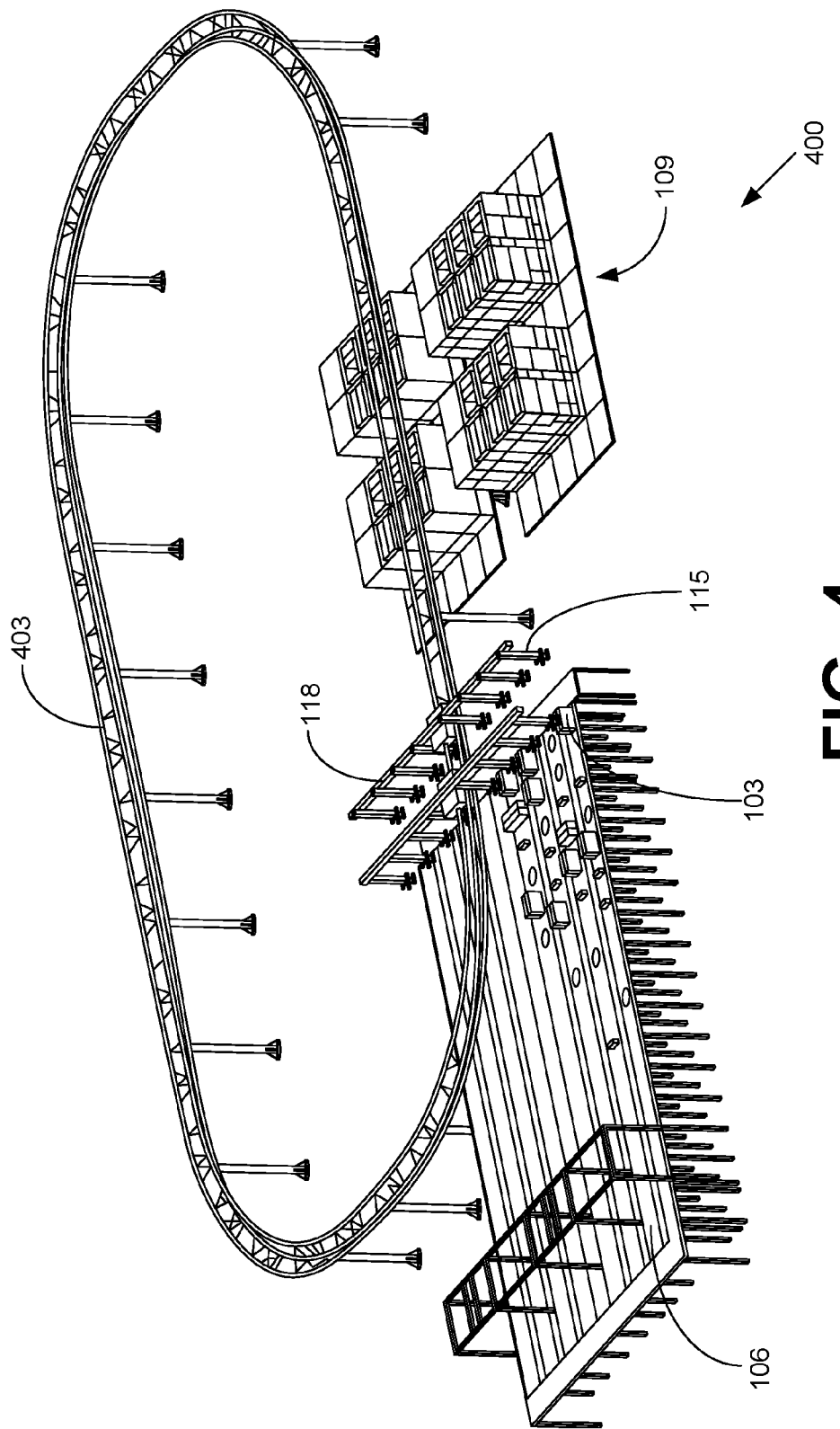
FIG. 4 is a drawing of a perspective view of a horizontally recirculating gantry system according to one embodiment of the present disclosure.

With reference to FIG. 4, shown is a perspective view of a horizontally recirculating gantry system 400 according to one embodiment. In contrast to the vertically recirculating gantry system 100 depicted in FIGS. 1-3, the horizontally recirculating gantry system 400 includes one or more gantries 118 that move about a horizontally oriented track 403. In one example, the horizontally oriented track 403 may comprise a rollercoaster-style track, which may be oval in shape or another shape. As shown, the gantries 118 may be centered on the horizontally oriented track 403. In various examples, the gantries 118 may be mounted above or below the horizontally oriented track 403. In one implementation, the gantries 118 may be propelled along the horizontally oriented track 403 using magnetic levitation technology.

As with the vertically recirculating gantry system 100, the horizontally recirculating gantry system 400 is operable to retrieve items 103 from the picking locations 106 via actuators 115 disposed on the gantries 118, and then to move the gantries 118 about the horizontally oriented track 403 toward the stowage locations 109. When passing over particular stowage locations 109, the actuators 115 can deposit their cargo in the stowage locations 109. Afterward, the gantries 118 continue along the horizontally oriented track 403 to return to the picking locations 106 to retrieve additional items 103. The horizontally oriented track 403 may be designed such that the returning gantries 118 do not interfere with or overlap the other gantries 118 that are moving items 103.

Figure 5:
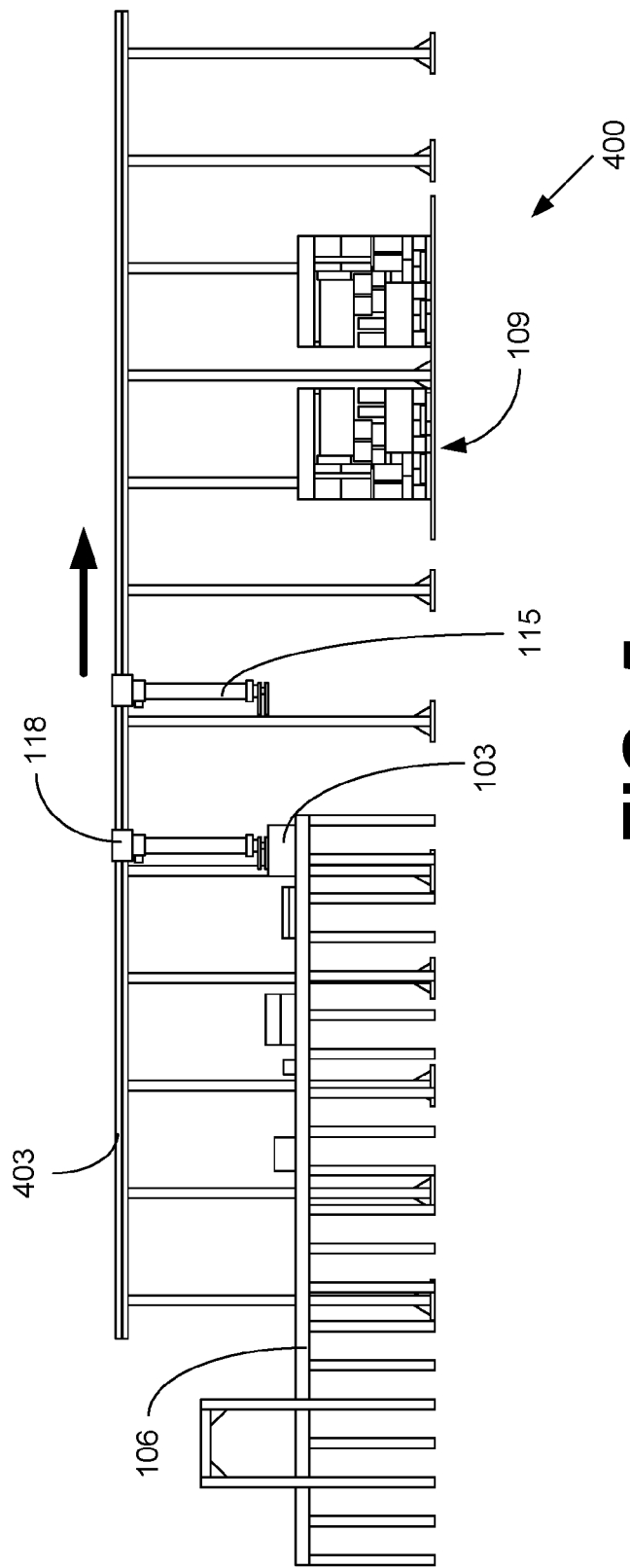
FIG. 5 is a drawing of a side view of the horizontally recirculating gantry system of FIG. 4 according to one embodiment of the present disclosure.

Continuing to FIG. 5, shown is a side view of the horizontally recirculating gantry system 400 of FIG. 4 according to one embodiment. The arrow indicates the direction of travel of the gantries 118 along the horizontally oriented track 403. It is noted that the gantries 118 and actuators 115 do not vertically invert in this embodiment, unlike the vertically recirculating gantry system 100 of FIG. 1.

Figure 6A:
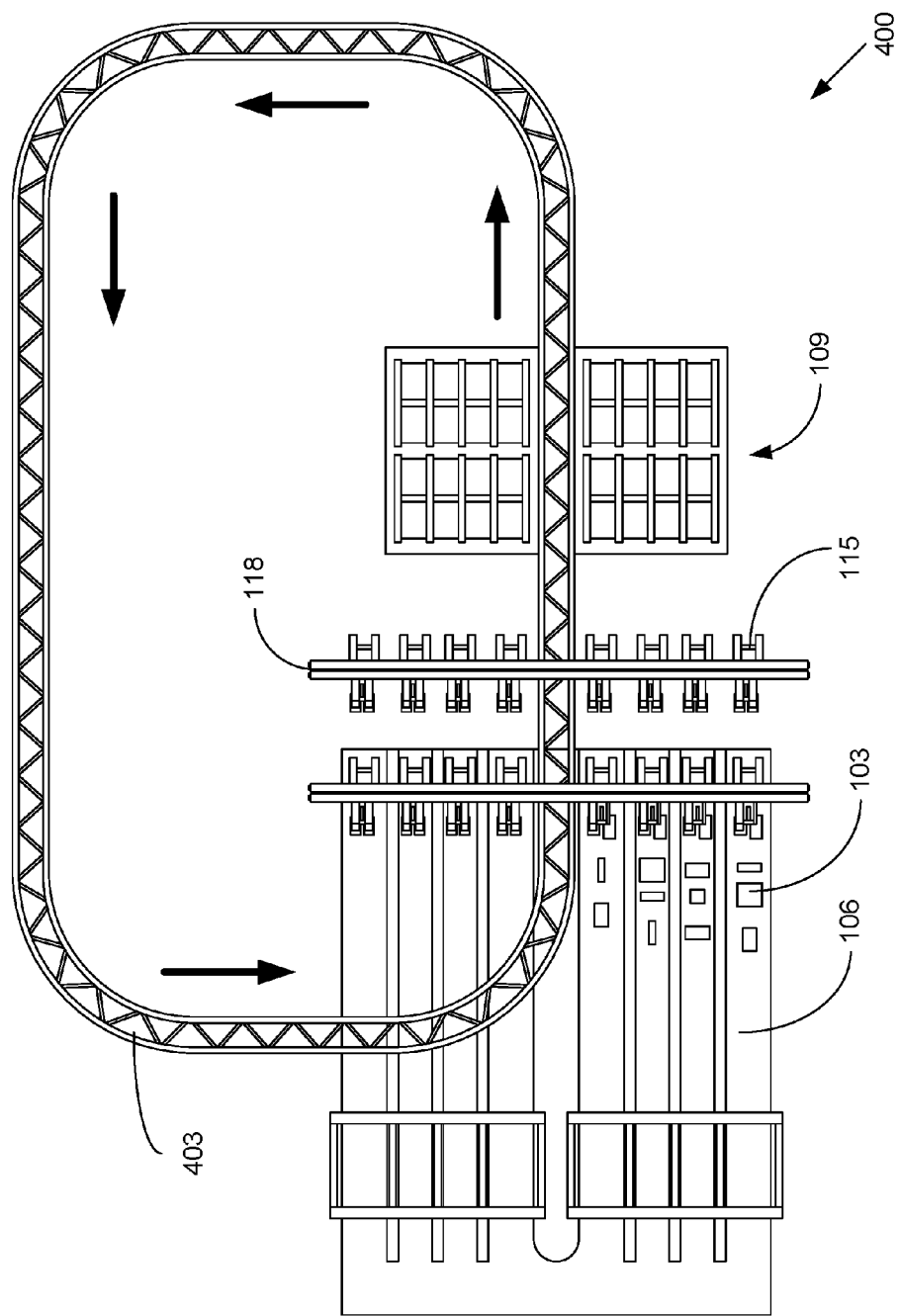
FIG. 6A is a drawing of an overhead view of the horizontally recirculating gantry system of FIG. 4 according to one embodiment of the present disclosure.

Moving on to FIG. 6A, shown is an overhead view of the horizontally recirculating gantry system 400 of FIG. 4 according to one embodiment. The arrow indicates the direction of travel of the gantries 118 along the horizontally oriented track 403 in a counter-clockwise direction, though the position of the picking locations 106 and the stowage locations 109 may be inverted in other embodiments, resulting in an opposite direction of travel.

Figure 6B:
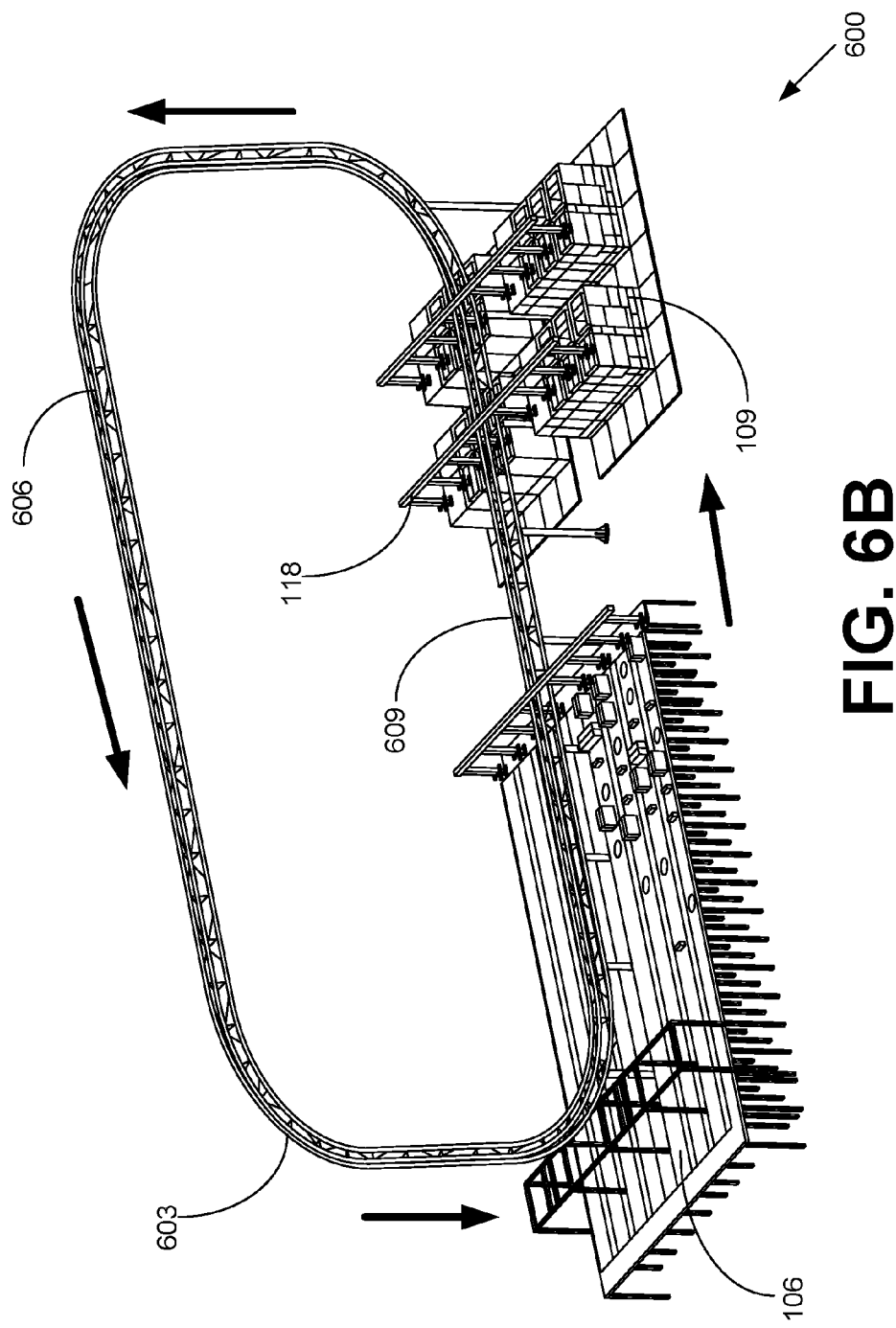
FIG. 6B is a drawing of a perspective view of a vertically recirculating gantry system using a rollercoaster-style track according to one embodiment of the present disclosure.

Turning now to FIG. 6B, shown is a perspective view of a vertically recirculating gantry system 600 using a rollercoaster-style track 603 according to one embodiment. Unlike the track 403 of FIGS. 4-6A, the track 603 is oriented for vertical recirculation. In particular, the track 603 includes an upper run 606 and a lower run 609 spaced vertically from each other. After the gantry 118 moves over the stowage locations 109, the gantry 118 continues on the track 603, vertically inverts, and then recirculates back to the pickup locations 106.

Figure 7:
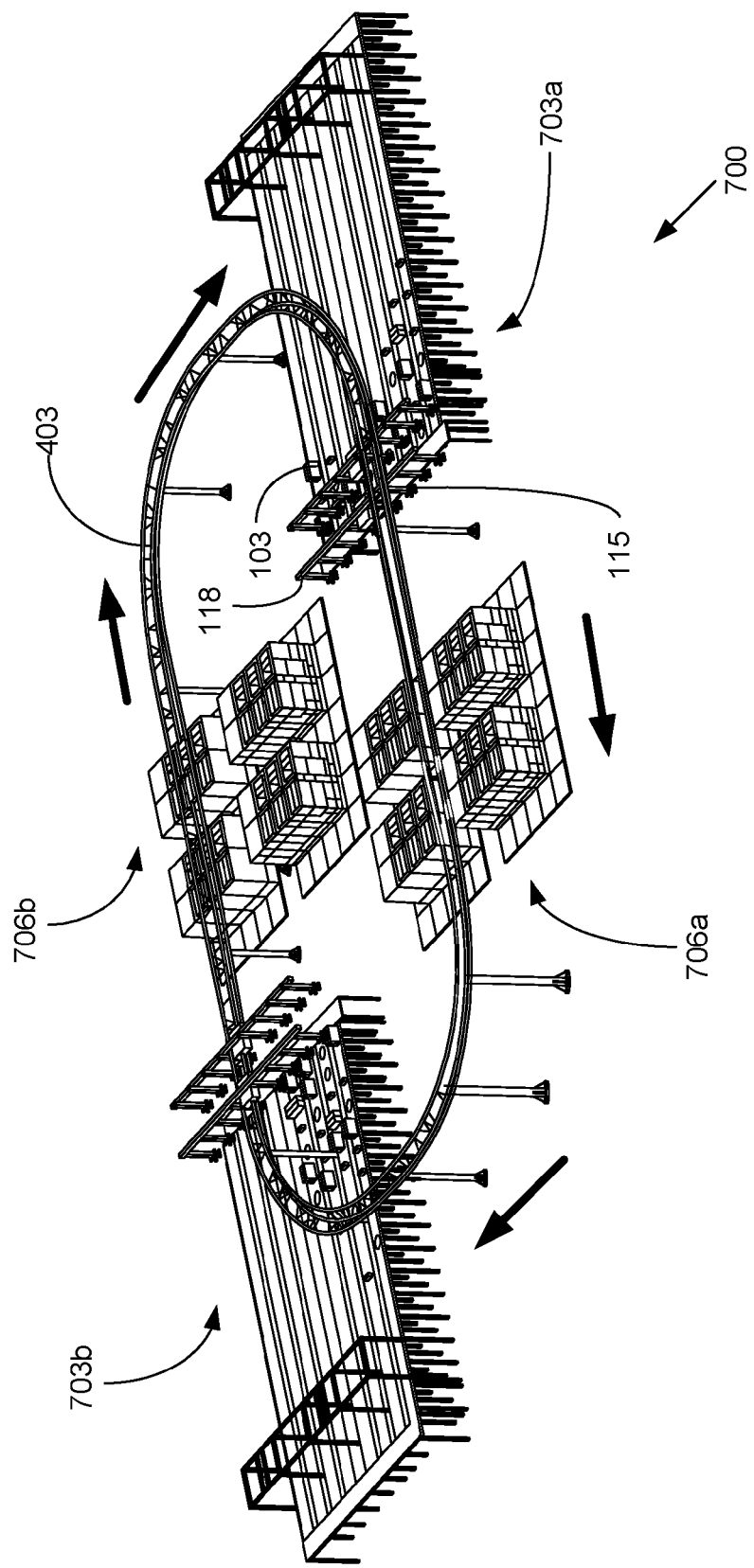
FIG. 7 is a drawing of a perspective view of a horizontally recirculating gantry system with multiple sets of conveyors and item storage locations according to one embodiment of the present disclosure.

With reference to FIG. 7, shown is a perspective view of a horizontally recirculating gantry system 700 according to one embodiment. As compared with the horizontally recirculating gantry system 400 of FIG. 4, there may be multiple sets of picking areas 703a and 703b and multiple sets of stowage areas 706a and 706b. In the example of FIG. 7, the sets of picking areas 703 and stowage areas 706 are mirrored on opposite sides of the horizontally oriented track 403.

The gantries 118 in this example travel in a clockwise direction about the horizontally oriented track 403. After retrieving items 103 from picking area 703a and depositing them in stowage area 706a, the gantries 118 and actuators 115 next retrieve items 103 from picking area 703b and deposit them in stowage area 706b, before recirculating about the horizontally oriented track 403 to return to the picking area 703a.

Depending on the size of the horizontally oriented track 403, any number of sets of picking areas 703 and stowage areas 706 may be provided. In addition, the vertically recirculating gantry system 100 may include multiple sets of picking areas 703 and stowage areas 706 arranged linearly along the track 121 (FIG. 1). However, the multiple sets of picking areas 703 and stowage areas 706 may be particularly beneficial with respect to a horizontally oriented track 403 due to the space necessary to accommodate the horizontally oriented track 403.

Figure 8:
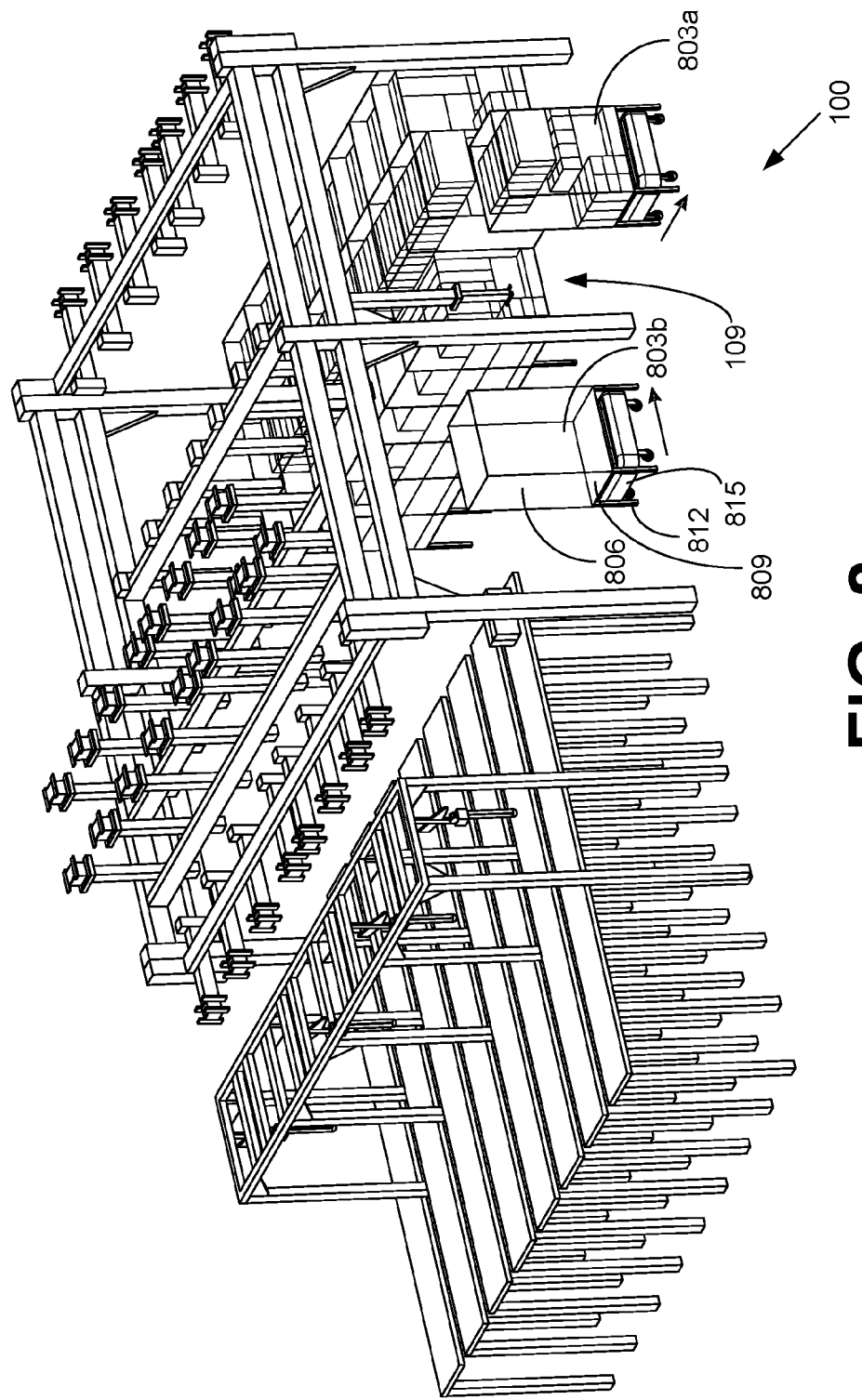
FIG. 8 is a drawing of a perspective view of the vertically recirculating gantry system of FIG. 1 that illustrates rotation of item storage locations according to one embodiment of the present disclosure.

Turning now to FIG. 8, shown is a perspective view of the vertically recirculating gantry system 100 of FIG. 1 that illustrates rotation of stowage locations 109 according to one embodiment. The same principles may apply to the horizontally recirculating gantry systems 400 (FIG. 4) and 700 (FIG. 7). Each of the stowage locations 109 is occupied by a respective storage unit 803. Each storage unit 803 comprises a gaylord 806 disposed on top of a pallet 809, thereby surrounding or enclosing a volume above the pallet 809. Each pallet 809 in turn sits above a pod 812 configured to accommodate a robotic drive unit 815.

In one preferred embodiment, robotic drive units 815 are utilized in order to move storage units 803 in and out of stowage locations 109. For example, as shown in FIG. 8, a storage unit 803a is being moved out of an item storage location 109 by a robotic drive unit 815, while a storage unit 803b is being moved into the item storage location 109 by a robotic drive unit 815. The storage units 803 may be moved away when they are determined to meet a capacity threshold in terms of volume, weight, or other factors. Alternatively, the storage units 803 may be moved away when it is determined that further items 103 are not to be sent to the common destination. An empty storage unit 803 may be moved in to replace the full storage unit 803. After the storage unit 803 is moved away, the gaylord 806 may be removed, and the pallet 809 bearing the items 103 may be wrapped or otherwise packaged. In other embodiments, the storage units 803 may be moved in and out manually via a dolly or forklift.

While the storage units 803 are being moved in and out, the operation of the vertically recirculating gantry system 100 may be temporarily paused. Where possible, the vertically recirculating gantry system 100 may be configured to assign items 103 to alternate stowage locations 109, thereby avoiding interference with the particular storage units 803a and 803b being moved out and in, respectively. For example, any items 103 present on the conveyors that are to be stowed on a pallet or in a location not currently positioned in the stowage area may remain on the conveyors until the stowage location is ready to receive the items 103.

Figure 9:
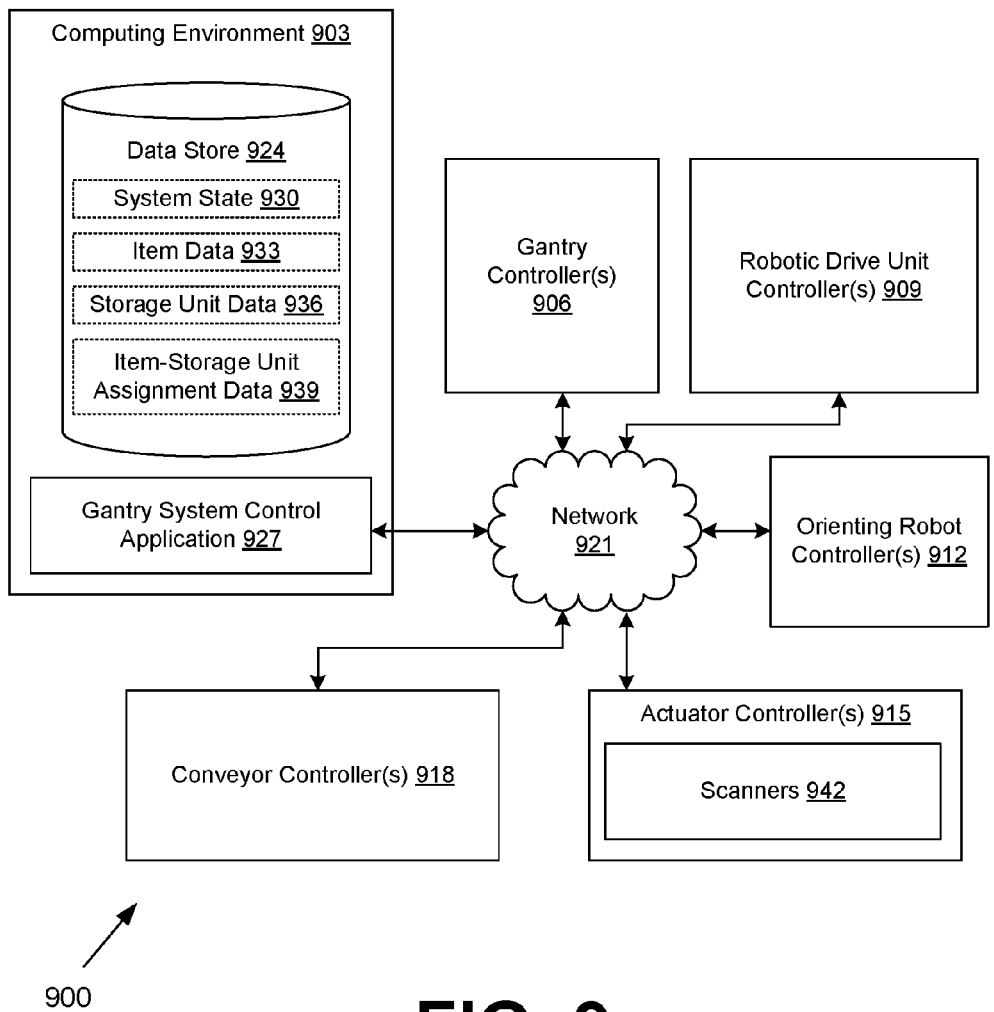
FIG. 9 is a schematic block diagram of a networked environment according to various embodiments of the present disclosure.

With reference to FIG. 9, shown is a networked environment 900 according to various embodiments. The networked environment 900 includes a computing environment 903, one or more gantry controllers 906, one or more robotic drive unit controllers 909, one or more orienting robot controllers 912, one or more actuator controllers 915, and one or more conveyor controllers 918, which are in data communication via a network 921. The network 921 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 903 may comprise, for example, a server computer or any other system providing computing capability. Alternatively, the computing environment 903 may employ a plurality of computing devices that may be arranged, for example, in one or more server banks or computer banks or other arrangements. Such computing devices may be located in a single installation or may be distributed among many different geographical locations. For example, the computing environment 903 may include a plurality of computing devices that together may comprise a hosted computing resource, a grid computing resource, and/or any other distributed computing arrangement. In some cases, the computing environment 903 may correspond to an elastic computing resource where the allotted capacity of processing, network, storage, or other computing-related resources may vary over time.

Various applications and/or other functionality may be executed in the computing environment 903 according to various embodiments. Also, various data is stored in a data store 924 that is accessible to the computing environment 903. The data store 924 may be representative of a plurality of data stores 924 as can be appreciated. The data stored in the data store 924, for example, is associated with the operation of the various applications and/or functional entities described below.

The components executed on the computing environment 903, for example, include a gantry system control application 927 and other applications, services, processes, systems, engines, or functionality not discussed in detail herein. The gantry system control application 927 is executed to orchestrate control of the operation of a gantry system, such as the vertically recirculating gantry system 100 or the horizontally recirculating gantry system 400 or 700. The gantry system control application 927 may be a part of a larger system that orchestrates sortation of items 103 that are inbound to or outbound from a materials handling facility.

The data stored in the data store 924 includes, for example, system state 930, item data 933, storage unit data 936, item-storage unit assignment data 939, and potentially other data. The system state 930 records a current state of a gantry system, including operational status of picking locations 106, actuators 115, and gantries 118, as well as status of stowage locations 109 and positions of storage units 803. The item data 933 includes various information about items 103 being processed by the gantry system, including, for example, weight, dimensions, destination, fragility or hazardous characteristics, and so forth.

The storage unit data 936 includes various information about storage units 803 being loaded via the gantry system, including, for example, capacities, destinations, fragility or hazardous characteristics of assigned items 103, current location in the materials handling facility, and so on. The item-storage unit assignment data 939 records the assignments of items 103 to storage units 803. These assignments may have already been implemented, or may be tentative (awaiting implementation by the gantry system).

The gantry controllers 906 include circuitry configured to operate gantries 118 about a track 121 or a horizontally oriented track 403. The gantry controllers 906 may report a current position relative to a track 121 or a horizontally oriented track 403. The gantry controllers 906 may be commanded to move in a specified direction and at a specified speed along a track 121 or a horizontally oriented track 403. In some embodiments, the gantries 118 may be controlled via a common drive mechanism. For example, the gantries 118 may latch onto a moving cable. The gantries 118 on a single track 121 or horizontally oriented track 403 may be independently operable, or multiple gantries 118 may operate in unison. Where the gantries 118 are horizontally telescoping, the gantry controller 906 may direct a gantry 118 to expand or contract, thereby changing the width of the gantry 118 as desired.

The robotic drive unit controllers 909 include circuitry configured to operate robotic drive units 815 in the materials handling facility. The robotic drive units 815 may be independently powered (e.g., via a battery) and may autonomously navigate the floor of the materials handling facility.

The orienting robot controllers 912 include circuitry configured to operate robots 112 in order to correctly orient incoming items 103 on picking locations 106. The robots 112 may include sensors to detect current positions of items 103 and actuators in order to move the items 103 to correct positions. The correct positions are determined in order to accommodate the incoming actuators 115 that will retrieve the items 103.

The actuator controllers 915 include circuitry configured to operate actuators 115 on gantries 118. The actuator controllers 915 may report current status of the actuators 115, such as position on the gantries 118, extension length, whether an item 103 is being conveyed, and so forth. The actuator controllers 915 may control lateral movement of the actuators 115 along the gantries 118, extension length of the actuators 115, and whether the actuators 115 are applying force, vacuum grip, and/or other techniques to retrieve and transport items 103. The actuator controllers 915 may control scanners 942 that scan identifiers such as radio-frequency identifiers (RFIDs), barcodes, and/or other identifiers on the items 103 in order to identify the items 103.

The conveyor controllers 918 include circuitry configured to operate the picking locations 106. The picking locations 106 may be turned on or off, and the direction and/or speed of the operation may be adjusted. The conveyor controllers 918 may report the current status of the picking locations 106.

Figure 10:
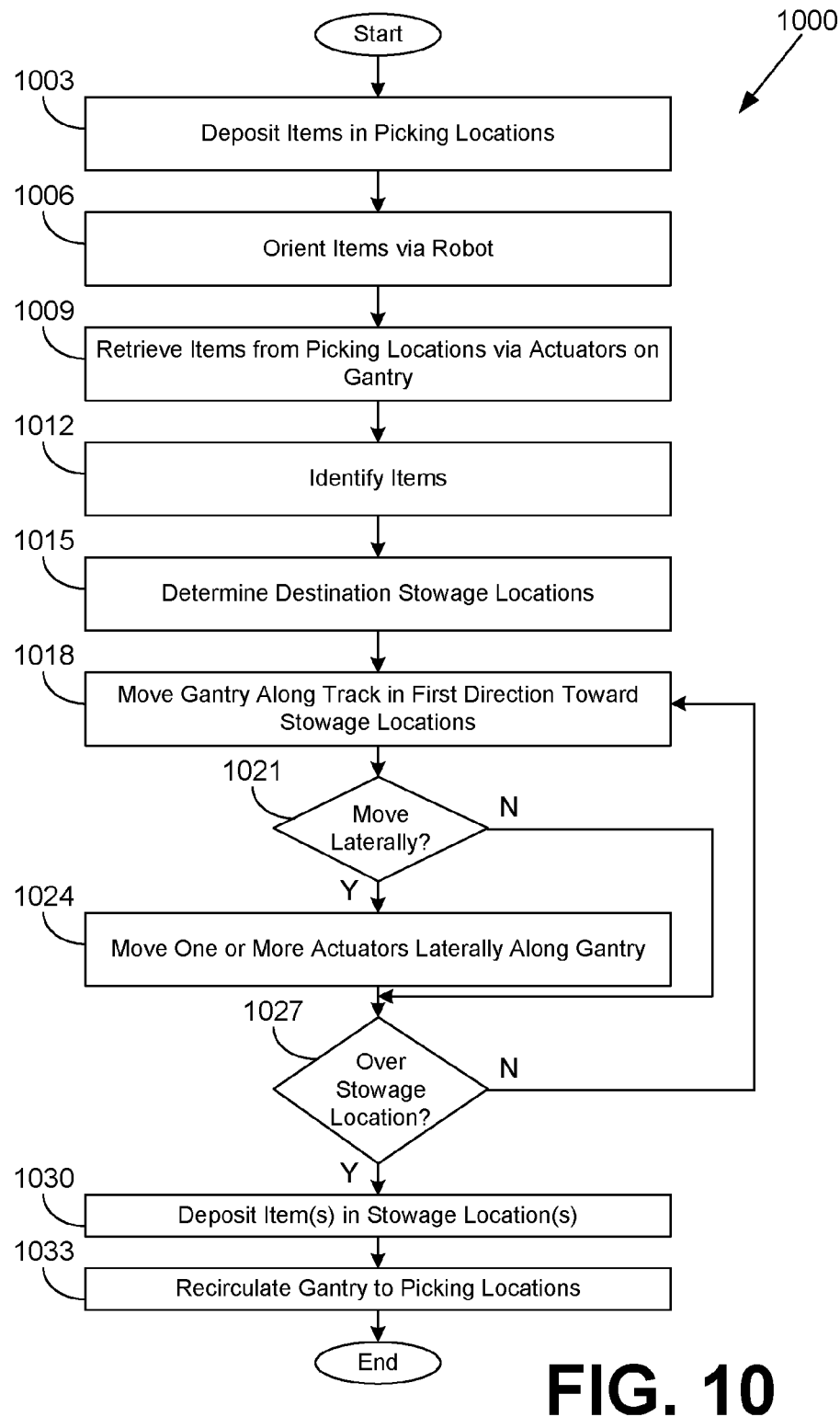
FIG. 10 is a flowchart illustrating one example of functionality implemented as portions of a gantry system according to various embodiments of the present disclosure.

Referring next to FIG. 10, shown is a flowchart that provides one example of the operation of a portion of a gantry system 1000 corresponding to the vertically recirculating gantry system 100 of FIG. 1 or the horizontally recirculating gantry system 400 of FIG. 4 according to various embodiments. It is understood that the flowchart of FIG. 10 provides merely an example of the many different types of functional arrangements that may be employed to implement the operation of the portion of the gantry system 1000 as described herein. As an alternative, the flowchart of FIG. 10 may be viewed as depicting an example of elements of a method implemented in the computing environment 903 (FIG. 9) according to one or more embodiments.

Beginning with box 1003, items 103 are deposited onto picking locations 106 of the gantry system 1000, and the picking locations 106 are operated by the conveyor controller(s) 918 to advance the items 103 toward the robots 112. In box 1006, the robots 112 are operated by the orienting robot controllers 912 to orient the items 103 so as to be in a correct orientation to be retrieved from the picking locations 106 by the actuators 115.

In box 1009, the actuators 115 on a gantry 118 are operated via the gantry controllers 906 and the actuator controllers 915 to retrieve the items 103 from the picking locations 106. In box 1012, the items 103 are identified via scanning respective identifiers on the items 103 via the scanners 942 of the actuators 115. In box 1015, the gantry system control application 927 determines destination stowage locations 109 for the identified items 103 according to the item-storage unit assignment data 939. The destination stowage locations 109 may be determined according to a variety of factors including common shipping destination, fragility and/or hazardous characteristics, available capacity in a storage unit 803, possible stowage locations 109 that can be reached by the corresponding actuator 115, and so forth.

In box 1018, the gantry 118 is moved via the gantry controller 906 along the track 121 or horizontally oriented track 403 toward the stowage locations 109. In box 1021, the gantry system control application 927 determines whether to move one or more actuators 115 laterally along the gantry 118. The actuators 115 may need to be moved left or right in order to reach a particular item storage location 109 or to position the item 103 within the particular stowage location 109. In some cases, moving one actuator 115 may require that another actuator 115 be moved in order to make room. If actuators 115 are to be moved laterally, the actuator controller(s) 915 effect the lateral movement along the gantry 118 in box 1024. Otherwise, the flow proceeds to box 1027.

In box 1027, the gantry system control application 927 determines whether the gantry 118 is over a particular destination stowage location 109 for an item 103 currently held by an actuator 115. If so, the actuator controller 915 causes the item 103 to be deposited in the item storage location 109 in box 1030. If the gantry 118 is not over a particular destination stowage location 109, the flow returns to box 1018 and the gantry 118 continues movement along the track. It is noted that a gantry 118 may have multiple actuators 115 operating in parallel and that items 103 may be deposited at different times and at different stowage locations 109.

After all items 103 are deposited, in box 1033, the gantry 118 is recirculated along the track to the picking locations 106. In some embodiments (e.g., the embodiment of FIG. 7), the gantry 118 may recirculate to a different set of picking locations 106 before retrieving another set of items 103 and depositing those items 103 to a different set of stowage locations 109. After this, the gantry 118 may recirculate to the original set of picking locations 106.

Figure 11:
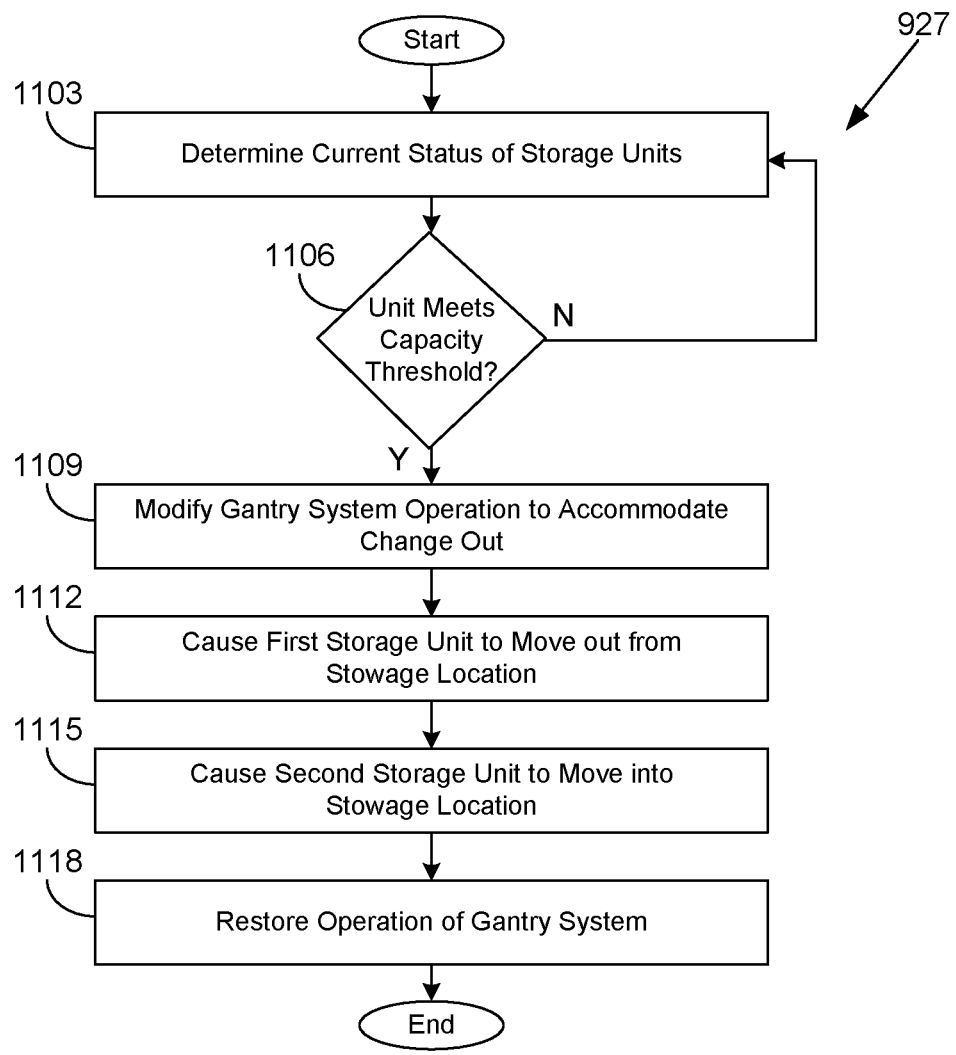
FIG. 11 is a flowchart illustrating one example of functionality implemented as portions of a gantry system control application executed in a computing environment in the networked environment of FIG. 9 according to various embodiments of the present disclosure.

Referring next to FIG. 11, shown is a flowchart that provides one example of the operation of a portion of a gantry system control application 927. It is understood that the flowchart of FIG. 11 provides merely an example of the many different types of functional arrangements that may be employed to implement the operation of the portion of the gantry system control application 927 as described herein. As an alternative, the flowchart of FIG. 11 may be viewed as depicting an example of elements of a method implemented in the computing environment 903 (FIG. 9) according to one or more embodiments.

Beginning with box 1103, the gantry system control application 927 determines the current status of the storage units 803 at the stowage locations 109. For example, the gantry system control application 927 may determine which items 103 are stored and/or assigned to the storage units 803, their weights, their dimensions, and so forth. In box 1106, the gantry system control application 927 determines whether a storage unit 803 meets, or is soon predicted to meet, a capacity threshold. If not, the gantry system control application 927 returns to box 1103 and reassesses the current status in view of additional events.

If a storage unit 803 meets a capacity threshold, the gantry system control application 927 modifies the gantry system 1000 operation to accommodate the change out of a storage unit 803 in box 1109. This may involve pausing operation of portions of the gantry system 1000, redirecting items 103 to other stowage locations 109, allowing items 103 to queue up on the picking locations 106, or other actions.

In box 1112, the gantry system control application 927 causes a first storage unit 803 to move out from the stowage location 109. In this regard, the gantry system control application 927 may direct a robotic drive unit 815 to travel to the storage unit 803, lift the storage unit 803, and transport the storage unit 803 away from the stowage location 109.

In box 1115, the gantry system control application 927 causes a second storage unit 803 to move into the stowage location 109. The second storage unit 803 may be empty or may contain items 103. In this regard, the gantry system control application 927 may direct a robotic drive unit 815 to travel to the second storage unit 803, lift the second storage unit 803, and transport the storage unit 803 to the stowage location 109.

In box 1118, the gantry system control application 927 restores operation of the gantry system 1000 so that items 103 begin being assigned to the stowage location 109 where the second storage unit 803 is positioned. Thereafter, the operation of the portion of the gantry system control application 927 ends.

Figure 12:
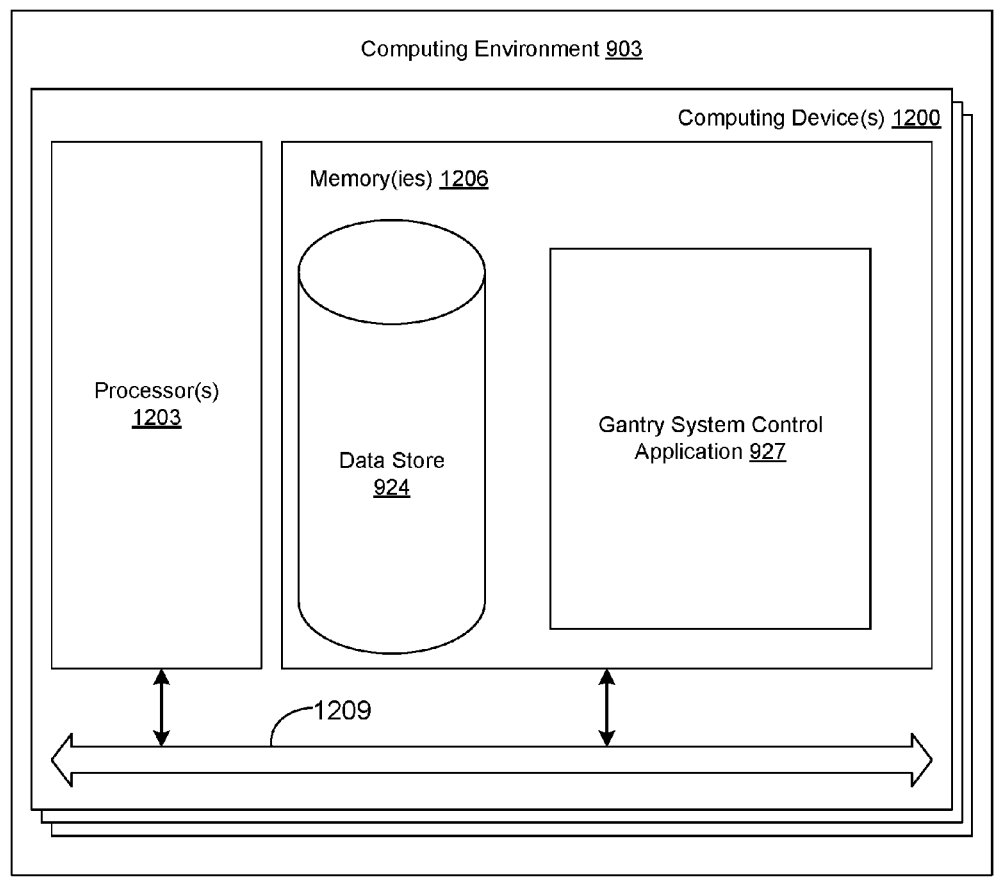
FIG. 12 is a schematic block diagram that provides one example illustration of a computing environment employed in the networked environment of FIG. 9 according to various embodiments of the present disclosure.

With reference to FIG. 12, shown is a schematic block diagram of the computing environment 903 according to an embodiment of the present disclosure. The computing environment 903 includes one or more computing devices 1200. Each computing device 1200 includes at least one processor circuit, for example, having a processor 1203 and a memory 1206, both of which are coupled to a local interface 1209. To this end, each computing device 1200 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the gantry system control application 927 and potentially other applications. Also stored in the memory 1206 may be a data store 924 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and/or multiple processor cores and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the gantry system control application 927 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 10 and 11 show the functionality and operation of an implementation of portions of the gantry system 1000 and/or the gantry system control application 927. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 10 and 11 show a specific order of execution, it is understood that the order of execution may differ from that which is depicted. For example, the order of execution of two or more blocks may be scrambled relative to the order shown. Also, two or more blocks shown in succession in FIGS. 10 and 11 may be executed concurrently or with partial concurrence. Further, in some embodiments, one or more of the blocks shown in FIGS. 10 and 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the gantry system control application 927, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the gantry system control application 927, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1200, or in multiple computing devices 1200 in the same computing environment 903.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described by the following clauses:

Clause 1. A system, comprising: a recirculating track having a lower run and an upper run spaced vertically from each other; a plurality of conveyors in parallel and at least partially disposed beneath the track; a plurality of stowage locations in parallel and disposed at least partially beneath the track, the stowage locations being spaced from the conveyors in a first direction; a plurality of gantries supported for movement along the track in the first direction and spanning a width of the plurality of conveyors and the plurality of stowage locations; and a respective plurality of actuators disposed on individual ones of the plurality of gantries and operable to retrieve a plurality of items from the conveyors and deposit the items to respective stowage locations as the individual ones of the plurality of gantries move along the track in the first direction over the plurality of conveyors and the plurality of storage locations, wherein the gantries are operable to recirculate from the stowage locations to the conveyors by continuing to move in the first direction along the track so that the gantries return in a second direction opposite of the first direction.

Clause 2. The system of clause 1, wherein each actuator is configured to move laterally on a corresponding gantry in order to access at least two of the plurality of stowage locations.

Clause 3. The system of clauses 1 to 2, wherein each gantry and the respective plurality of actuators vertically inverts while returning to the plurality of conveyors on the track.

Clause 4. A system, comprising: a track including a lower run and an upper run spaced vertically from each other, the track being disposed at least partially above a picking area comprising plural side-by-side picking locations and at least partially above a stowage area comprising plural side-by-side stowage locations spaced from the picking locations in a first direction; a gantry supported for movement along the track in the first direction and spanning the picking area and the stowage area; at least one actuator disposed on the gantry and operable to retrieve an item from one of the picking locations and deposit the item in one of the stowage locations as the gantry moves along the track in the first direction over the picking area and the stowage area; and wherein the gantry is operable to vertically recirculate from the stowage area to the picking area by continuing to move in the first direction along the track so that the gantry returns in a second direction opposite to the first direction.

Clause 5. The system of clause 4, further comprising: at least one computing device; and instructions executable in the at least one computing device, wherein when executed the instructions cause the at least one computing device to at least: receive an identifier of a particular item from a scanner; determine a particular stowage location of the stowage locations based at least in part on the identifier; and cause the at least one actuator to deposit the particular item in the particular stowage location.

Clause 6. The system of clauses 4 to 5, further comprising: at least one computing device; and instructions executable in the at least one computing device, wherein when executed the instructions cause the at least one computing device to at least: determine that a capacity threshold for a first storage unit at a particular stowage location of the stowage locations is met; cause a first robotic drive unit to move the first storage unit out of the particular stowage location; and cause a second robotic drive unit to move a second storage unit to the particular stowage location.

Clause 7. The system of clauses 4 to 6, wherein at least two of the stowage locations are arranged in line in the first direction with a particular picking location of the picking locations.

Clause 8. The system of clauses 4 to 7, wherein at least one of the stowage locations comprises a gaylord disposed on top of a pallet.

Clause 9. The system of clause 8, wherein the pallet rests upon a pod configured to accommodate a robotic drive unit.

Clause 10. The system of clauses 4 to 9, further comprising a respective robot configured to orient items on a particular picking location of the picking locations in order to be retrieved by a particular actuator of the at least one actuator.

Clause 11. The system of clauses 4 to 10, wherein the at least one actuator is configured to move laterally along the gantry.

Clause 12. The system of clauses 4 to 11, wherein the at least one actuator is configured to perform vertically telescoping movement.

Clause 13. The system of clauses 4 to 12, wherein the at least one actuator is configured to retain the item via a vacuum applied by a pneumatic pad.

Clause 14. The system of clauses 4 to 13, wherein the gantry further comprises a plurality of gantries, and a respective plurality of actuators is disposed on individual ones of the plurality of gantries.

Clause 15. The system of clauses 4 to 14, wherein the picking locations are respective conveyors.

Clause 16. A method, comprising: retrieving a plurality of items from a plurality of side-by-side picking locations via a plurality of actuators disposed on a gantry spanning a width of the picking locations; moving the gantry along a track in a first direction toward a plurality of side-by-side stowage locations, the plurality of stowage locations being spaced from the plurality of picking locations in the first direction, wherein the track has a lower run and an upper run spaced vertically from each other; and depositing individual ones of the plurality of items in respective ones of the plurality of stowage locations via the plurality of actuators as the gantry moves over the plurality of stowage locations.

Clause 17. The method of clause 16, further comprising moving the gantry along the track in the first direction to return to the plurality of picking locations.

Clause 18. The method of clause 17, wherein the gantry and the plurality of actuators vertically invert while moving to return to the plurality of picking locations.

Clause 19. The method of clauses 16 to 18, further comprising: determining that a capacity threshold is met for a first item storage unit at a particular stowage location of the plurality of stowage locations; moving, via a first robotic drive unit, the first item storage unit out from the particular stowage location; and moving, via a second robotic drive unit, a second item storage unit into the particular stowage location.

Clause 20. The method of clauses 16 to 19, further comprising: scanning an identifier on a particular item of the plurality of items; and determining a particular stowage location into which the item is to be deposited based at least in part on the identifier.

Clause 21. A system, comprising: a horizontally oriented recirculating track; a first picking area defining a first plurality of picking locations and a second picking area defining a second plurality of picking locations; a plurality of gantries spanning the first plurality of picking locations or the second plurality of picking locations and supported for movement along the track; a plurality of actuators supported on each of the plurality of gantries; a first stowage area defining a first plurality of side-by-side stowage locations disposed at least partially beneath the track and spaced from the first plurality of picking locations in a direction of movement of the plurality of gantries along the track; a second stowage area defining a second plurality of side-by-side stowage locations disposed at least partially beneath the track and spaced from the second plurality of picking locations in the direction of movement of the plurality of gantries along the track; and wherein, when operated, each plurality of actuators individually retrieves a first plurality of items from the first plurality of picking locations and then deposits individual ones of the first plurality of items in respective ones of the first plurality of stowage locations as a corresponding one of the plurality of gantries moves along the track over the respective ones of the first plurality of stowage locations, and subsequently, each plurality of actuators individually retrieves a second plurality of items from the second plurality of picking locations and then deposits individual ones of the second plurality of items in respective ones of the second plurality of stowage locations as the corresponding one of the plurality of gantries moves along the track over the respective ones of the second plurality of stowage locations.

Clause 22. The system of clause 21, wherein the picking locations correspond to a plurality of conveyors.

Clause 23. The system of clauses 21 to 22, wherein each of the picking locations has a respective robot configured to orient items for retrieval by a respective actuator.

Clause 24. A system, comprising: a horizontally oriented track including a first segment extending in a first direction, the track being disposed at least partially above a picking area comprising plural side-by-side picking locations and at least partially above a stowage area comprising side-by-side stowage locations spaced from the picking locations in the first direction; a gantry supported for movement on the track and spanning the picking and stowage locations; a plurality of actuators disposed on the gantry and operable to retrieve an item from one of the picking locations and deposit the item in one of the stowage locations as the gantry moves along the track in the first direction over the picking area and the stowage area; and wherein the gantry is operable to recirculate from the stowage area to the picking area by continuing to move in the first direction along the track so that the gantry returns in a second direction opposite to the first direction.

Clause 25. The system of clause 24, wherein the gantry is centered on the horizontally oriented track.

Clause 26. The system of clauses 24 to 25, wherein the horizontally oriented track is a rollercoaster-style oval track.

Clause 27. The system of clauses 24 to 26, wherein each of the stowage locations is arranged in line in the first direction with a particular picking location of the picking locations.

Clause 28. The system of clauses 24 to 27, wherein individual ones of the plurality of actuators are configured to perform vertically telescoping movement.

Clause 29. The system of clauses 24 to 28, wherein individual ones of the plurality of actuators are configured to move laterally along the gantry.

Clause 30. The system of clauses 24 to 29, further comprising: at least one computing device; and instructions executable in the at least one computing device, wherein when executed the instructions cause the at least one computing device to at least: receive an identifier of the item from a scanner; determine a particular stowage location of the stowage locations based at least in part on the identifier; and cause a corresponding actuator of the plurality of actuators to deposit the item in the particular stowage location.

Clause 31. The system of clause 30, wherein the scanner comprises at least one of: a radio-frequency identifier scanner or a barcode scanner.

Clause 32. A method, comprising: retrieving a plurality of items from a plurality of side-by-side picking locations via a plurality of actuators disposed on a gantry spanning a width of the plurality of picking locations; moving the gantry along a track in a first direction toward a plurality of side-by-side stowage locations, the gantry being centered on the track, the plurality of stowage locations being spaced from the plurality of picking locations in the first direction; and depositing individual ones of the plurality of items in respective ones of the plurality of stowage locations via the plurality of actuators as the gantry moves over the plurality of stowage locations.

Clause 33. The method of clause 32, wherein depositing the individual ones of the plurality of items in the respective ones of the stowage locations via the plurality of actuators further comprises placing an item within a gaylord disposed on top of a pallet.

Clause 34. The method of clauses 32 to 33, wherein the track has a lower run and an upper run that are spaced vertically from each other.

Clause 35. The method of clauses 32 to 34, wherein the track is a rollercoaster-style track.

Clause 36. The method of clauses 32 to 35, further comprising, after depositing the individual ones of the plurality of items in the respective ones of the plurality of item storage locations, moving the gantry along the track over another plurality of side-by-side picking locations.

Clause 37. The method of clause 36, further comprising retrieving another plurality of items from the other plurality of picking locations via the plurality of actuators.

Clause 38. The method of clause 37, further comprising moving the gantry along the track toward another plurality of side-by-side stowage locations.

Clause 39. The method of clause 38, further comprising depositing individual ones of the other plurality of items in respective ones of the other plurality of stowage locations via the plurality of actuators as the gantry moves over the other plurality of stowage locations.

Clause 40. The method of clause 39, further comprising, after depositing the individual ones of the other plurality of items in the respective ones of the other plurality of stowage locations, moving the gantry along the track in the first direction to recirculate to the plurality of picking locations.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:
1. A system, comprising:
  a recirculating track having a lower run and an upper run spaced vertically from each other;
  a plurality of conveyors in parallel and at least partially disposed beneath the track;

a plurality of stowage locations in parallel and disposed at least partially beneath the track, the stowage locations being spaced from the conveyors in a first direction;

a plurality of gantries supported for movement along the track in the first direction and spanning a width of the plurality of conveyors and the plurality of stowage locations; and a respective plurality of actuators disposed on individual ones of the plurality of gantries and operable to retrieve a plurality of items from the conveyors and deposit the items to respective stowage locations as the individual ones of the plurality of gantries move along the track in the first direction over the plurality of conveyors and the plurality of storage locations, wherein the gantries are operable to recirculate from the stowage locations to the conveyors by continuing to move in the first direction along the track so that the gantries return in a second direction opposite of the first direction.

2. The system of claim 1, wherein each actuator is configured to move laterally on a corresponding gantry in order to access at least two of the plurality of stowage locations.

3. The system of claim 1, wherein each gantry and the respective plurality of actuators vertically inverts while returning to the plurality of conveyors on the track.

4. A system, comprising:
a track including a lower run and an upper run spaced vertically from each other, the track being disposed at least partially above a picking area comprising plural side-by-side picking locations and at least partially above a stowage area comprising plural side-by-side stowage locations spaced from the picking locations in a first direction;

a gantry supported for movement along the track in the first direction and spanning the picking area and the stowage area;

at least one actuator disposed on the gantry and operable to retrieve an item from one of the picking locations and deposit the item in one of the stowage locations as the gantry moves along the track in the first direction over the picking area and the stowage area; and wherein the gantry is operable to vertically recirculate from the stowage area to the picking area by continuing to move in the first direction along the track so that the gantry returns in a second direction opposite to the first direction.

5. The system of claim 4, further comprising:
at least one computing device; and
instructions executable in the at least one computing device, wherein when executed the instructions cause the at least one computing device to at least:
receive an identifier of a particular item from a scanner;
determine a particular stowage location of the stowage locations based at least in part on the identifier; and
cause the at least one actuator to deposit the particular item in the particular stowage location.

6. The system of claim 4, further comprising:
at least one computing device; and
instructions executable in the at least one computing device, wherein when executed the instructions cause the at least one computing device to at least:
determine that a capacity threshold for a first storage unit at a particular stowage location of the stowage locations is met;
cause a first robotic drive unit to move the first storage unit out of the particular stowage location; and
cause a second robotic drive unit to move a second storage unit to the particular stowage location.

7. The system of claim 4, wherein at least two of the stowage locations are arranged in line in the first direction with a particular picking location of the picking locations.

8. The system of claim 4, wherein at least one of the stowage locations comprises a gaylord disposed on top of a pallet.

9. The system of claim 8, wherein the pallet rests upon a pod configured to accommodate a robotic drive unit.

10. The system of claim 4, further comprising a respective robot configured to orient items on a particular picking location of the picking locations in order to be retrieved by a particular actuator of the at least one actuator.

11. The system of claim 4, wherein the at least one actuator is configured to move laterally along the gantry.

12. The system of claim 4, wherein the at least one actuator is configured to perform vertically telescoping movement.

13. The system of claim 4, wherein the at least one actuator is configured to retain the item via a vacuum applied by a pneumatic pad.

14. The system of claim 4, wherein the gantry further comprises a plurality of gantries, and a respective plurality of actuators is disposed on individual ones of the plurality of gantries.

15. The system of claim 4, wherein the picking locations are respective conveyors.

16. A method, comprising:
retrieving a plurality of items from a plurality of side-by-side picking locations via a plurality of actuators disposed on a gantry spanning a width of the picking locations;
moving the gantry along a track in a first direction toward a plurality of side-by-side stowage locations, the plurality of stowage locations being spaced from the plurality of picking locations in the first direction, wherein the track has a lower run and an upper run spaced vertically from each other; and
depositing individual ones of the plurality of items in respective ones of the plurality of stowage locations via the plurality of actuators as the gantry moves over the plurality of stowage locations.

17. The method of claim 16, further comprising moving the gantry along the track in the first direction to return to the plurality of picking locations.

18. The method of claim 17, wherein the gantry and the plurality of actuators vertically invert while moving to return to the plurality of picking locations.

19. The method of claim 16, further comprising:
determining that a capacity threshold is met for a first item storage unit at a particular stowage location of the plurality of stowage locations;
moving, via a first robotic drive unit, the first item storage unit out from the particular stowage location; and
moving, via a second robotic drive unit, a second item storage unit into the particular stowage location.

20. The method of claim 16, further comprising:
scanning an identifier on a particular item of the plurality of items; and
determining a particular stowage location into which the item is to be deposited based at least in part on the identifier.

* * * * *